(12) United States Patent
Tielens et al.

(10) Patent No.: US 6,795,551 B1
(45) Date of Patent: Sep. 21, 2004

(54) CIRCUIT FOR REMOVING IN-BAND FSK SIGNALS WITHOUT MUTING OF RECEIVER

(75) Inventors: Theo Ary Asmund Tielens, Vught (NL); Renardus Henrikus Maria Kohlmann, Drunen (NL)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/482,380

(22) Filed: Jan. 13, 2000

(51) Int. Cl.[7] .................................................. H04M 9/08
(52) U.S. Cl. .............................. 379/406.01; 381/71.8; 381/71.11
(58) Field of Search .................... 379/406.01, 406.08, 379/142.02, 142.04, 93.23; 381/71.11, 71.8; 370/290; 708/322

(56) References Cited

U.S. PATENT DOCUMENTS

| | | | |
|---|---|---|---|
| 5,263,084 A | 11/1993 | Chaput et al. | 379/215 |
| 5,550,908 A | 8/1996 | Cai et al. | 379/215 |
| 5,574,777 A | 11/1996 | Lewis | 379/142 |
| 5,583,924 A | 12/1996 | Lewis | 379/142 |
| 5,588,049 A | 12/1996 | Detering et al. | 379/142 |
| 5,619,561 A | 4/1997 | Reese | 379/142 |
| 5,636,269 A | 6/1997 | Eisdorfer | 379/215 |
| 5,659,602 A | 8/1997 | Gay | 379/142 |
| 5,661,788 A | 8/1997 | Chin | 379/142 |
| 5,680,447 A | 10/1997 | Diamond et al. | 379/215 |
| 5,699,418 A | 12/1997 | Jones | 379/142 |
| 5,727,045 A | 3/1998 | Kim | 379/67 |
| 5,768,359 A | 6/1998 | DiPierro, Jr. et al. | 379/209 |
| 5,768,367 A | 6/1998 | Westergaard et al. | 379/413 |
| 5,771,283 A | 6/1998 | Chang et al. | 379/142 |
| 5,802,166 A | 9/1998 | Garcia et al. | 379/372 |
| 5,805,687 A | 9/1998 | Westergaard et al. | 379/215 |
| 5,809,128 A | 9/1998 | McMullin | 379/215 |
| 5,812,649 A | 9/1998 | Shen | 379/142 |
| 5,825,867 A | 10/1998 | Epler et al. | 379/215 |
| 5,836,009 A | * 11/1998 | Diamond et al. | 379/93.23 |
| 5,943,407 A | * 8/1999 | Davis et al. | 379/142.04 |

* cited by examiner

Primary Examiner—Forester W. Isen
Assistant Examiner—Con P. Tran
(74) Attorney, Agent, or Firm—Vedder Price Kaufman & Kammholz, P.C.

(57) ABSTRACT

A circuit for blocking reception of in-band frequency-shift keyed (FSK) signals by the reception transducer of a telephone subscriber terminal without requiring muting of the reception transducer. The incoming telephone reception signal, which contains both voice and frequency-shift keyed (FSK) signal components, is processed, e.g., within a digital signal processor (DSP), such that the FSK signal component is substantially cancelled. The incoming telephone reception signal is processed to extract amplitude, frequency and phase information, as well as to recover the FSK data clock. This FSK signal information is then used to generate a replica FSK signal for summing with the incoming telephone reception signal to cancel the FSK signal component. Echo cancellation of the local subscriber voice can also be implemented by adaptively filtering the incoming telephone reception signal in accordance with the outgoing telephone transmission signal and subtracting the resultant signal from the incoming telephone reception signal, thereby canceling the transmission signal echo component.

25 Claims, 3 Drawing Sheets

CIRCUIT FOR REMOVING IN-BAND FSK SIGNALS WITHOUT MUTING OF RECEIVER

BACKGROUND OF THE INVENTION

1. Field of the Invention

The present invention relates to telephone subscriber terminals, and in particular, to telephone subscriber terminals intended for receiving and processing in-band FSK signals, such as spontaneous call waiting identification (SCWID) information, during off-hook operation.

2. Description of the Related Art

Telephone service providers offer call feature information such as SCWID to many of their subscribers. To take advantage of such a feature, the subscriber uses special terminal equipment which processes the data, typically in the form of incoming in-band frequency-shift keyed (FSK) signals. These FSK signals are decoded to extract the feature data which are then displayed on some form of terminal display to identify the calling party. With this information available the subscriber can choose to ignore the new call, terminate an existing call and accept the new call, or place the existing call on hold and pick up the new call. (Other examples of call feature data offered by service providers include cash-card "charging" via a telephone terminal.) While features such as SCWID may be desirable, the means by which such a feature is provided does present a problem. The need to use in-band FSK signals to provide this service results in annoying data signals reaching the reception transducer (i.e., handset speaker) which disturb the incoming voice signals and are annoying to the terminal user, or subscriber.

The conventional technique of preventing these in-band FSK signals from annoying the terminal user is to mute the transducers of the terminal for the duration of the FSK signal reception. This approach, however, has the disadvantage of also muting or blocking reception of the voice or background noise information also being received as part of the telephone call. Hence, the user feels "disconnected" during this muting interval. Indeed, if the muting interval is too long, the user may believe that the call has become disconnected and will hang up. Such a technique is disclosed in U.S. Pat. No. 5,263,084 (the disclosure of which is incorporated herein by reference) in which a method is described for handling SCWID information by using a special telephone with the ability to mute the transducers in order to prevent the annoying in-band FSK tones from reaching the handset. Similarly, U.S. Pat. No. 5,768,367 (the disclosure of which is incorporated herein by reference), provides an adjunct that removes the in-band FSK signals from the voice reception path by removing all AC signals, thereby having the same effect as muting the reception transducer.

Accordingly, it would be desirable to have a circuit for blocking reception of the in-band FSK signals by the reception transducer of a telephone subscriber terminal without requiring muting of such reception transducer.

SUMMARY OF THE INVENTION

A circuit for blocking reception of in-band FSK signals by the reception transducer of a telephone subscriber terminal without requiring muting of the reception transducer in accordance with the present invention detects and substantially cancels the incoming FSK signals, thereby leaving the remaining signals, such as voice and background noise unaffected for the terminal user. Additionally, echo cancellation of the user's own voice signal can be provided to prevent interference with detection of the FSK signals.

In accordance with one embodiment of the present invention, a circuit for blocking reception of in-band frequency-shift keyed (FSK) signals by the reception transducer of a telephone subscriber terminal without requiring muting of the reception transducer includes a signal reception path and a FSK signal cancellation circuit. The signal reception path is configured to convey a telephone reception signal for conversion by a telephone reception transducer, wherein the telephone reception signal includes voice and FSK signal components. The FSK signal cancellation circuit, coupled to the signal reception path, is configured to substantially cancel the FSK signal components without interrupting the conveyance of the voice signal component.

In accordance with another embodiment of the present invention, a signal processor for blocking reception of in-band frequency-shift keyed (FSK) signals by the reception transducer of a telephone subscriber terminal without requiring muting of the reception transducer includes: signal reception means for conveying a telephone reception signal for conversion by a telephone reception transducer, wherein the telephone reception signal includes voice and FSK signal components; and FSK signal cancellation means, coupled to the signal reception means, for substantially canceling the FSK signal components without interrupting the conveyance of the voice signal component.

In accordance with still another embodiment of the present invention, a signal processor is programmed for blocking reception of in-band frequency-shift keyed (FSK) signals by the reception transducer of a telephone subscriber terminal without requiring muting of the reception transducer. The signal processor is programmed to perform the steps of: conveying a telephone reception signal for conversion by a telephone reception transducer, wherein the telephone reception signal includes voice and FSK signal components; and substantially canceling the FSK signal components without interrupting the conveyance of the voice signal component.

These and other features and advantages of the present invention will be understood upon consideration of the following detailed description of the invention and the accompanying drawings.

DETAILED DESCRIPTION OF THE INVENTION

Figure 1:
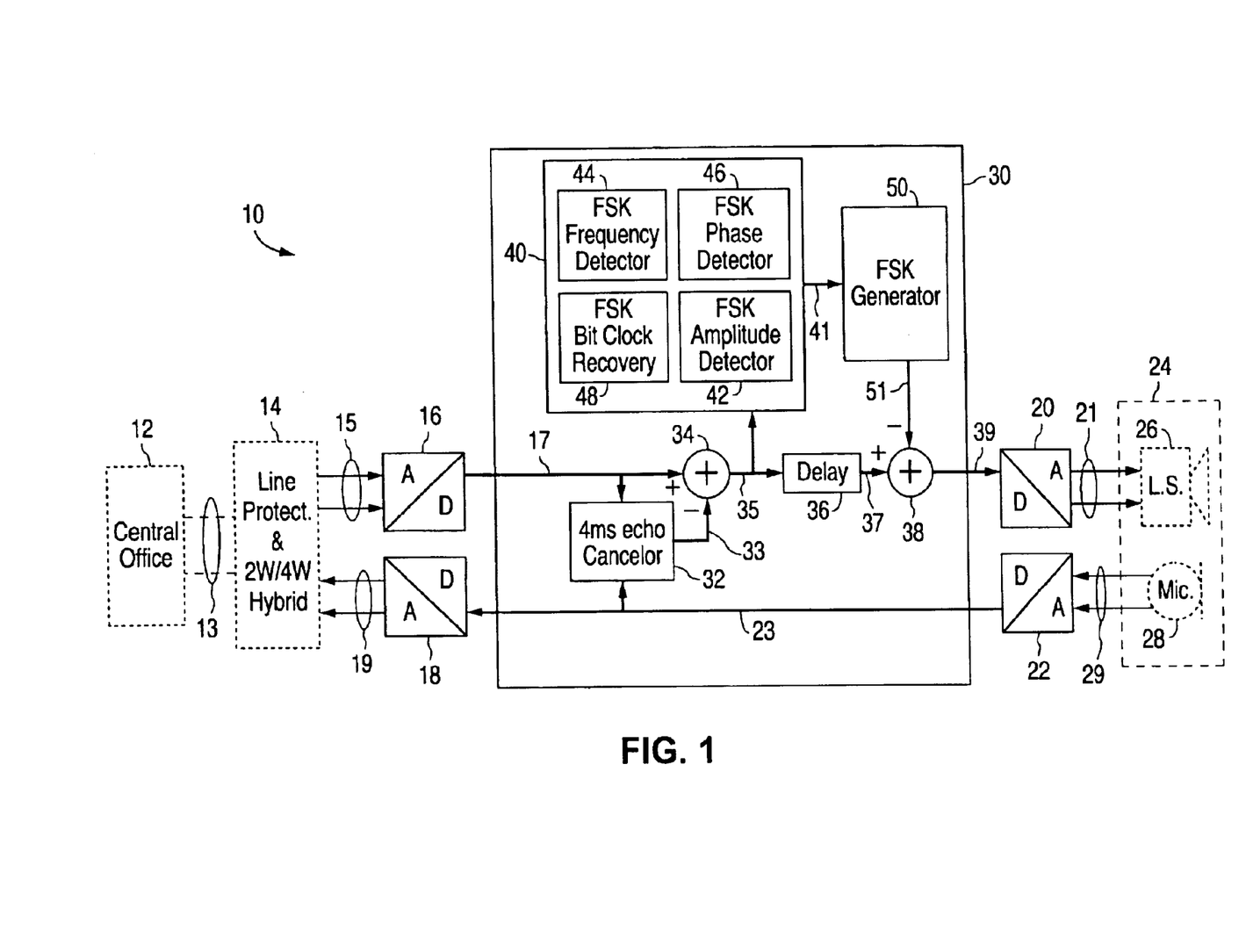
FIG. 1 is a functional block diagram of a telephone system using a circuit for blocking reception of in-band FSK signals by the reception transducer of a telephone subscriber terminal without requiring muting of the reception transducer in accordance with one embodiment of the present invention.

Referring to FIG. 1, a telephone system 10 using a circuit for blocking reception of in-band FSK signals by the reception transducer of a telephone subscriber terminal without requiring muting of the reception transducer in accordance with one embodiment of the present invention includes the functional elements substantially as shown. Connection is made between the central office 12 and the subscriber terminal 24 via telephone lines 13. A line protection and two-wire/four-wire (2W/4W) hybrid circuit 14 provides protection for the subscriber terminal as well as for combining and separating the transmit and receive signal paths at the subscriber terminal.

Incoming signals are conveyed on the reception lines 15 and are converted to a digital signal 17 by an analog-to-digital converter (ADC) 16. Outgoing signals 23 are converted from their digital form to analog signals by a digital-to-analog converter (DAC) 18 for conveyance by the transmission signal lines 19. Subsequent to being processed in accordance with the present invention (discussed in more detail below), the incoming digital signal information 39 is converted by another DAC 20 to an analog signal conveyed on lines 21 to the speaker 26 contained within the handset 24. Outgoing voice signals produced by the microphone 28 within the handset 24 are conveyed on lines 29 and converted by a DAC 22 to produce the outgoing transmission signal 23. In a preferred embodiment, the DACs 18, 20 and ADCs 16, 22 would be conventional CCITT G.711 CODECs with a sample frequency of 8 kilohertz and using 8 bits per sample.

The telephone reception signals 17 and transmission signals 23 are conveyed via a processor stage 30 which, in a preferred embodiment, would be implemented in the form of a programmed digital signal processor (DSP) such as a TMS320C54 (manufactured by Texas Instruments) or other dedicated DSP with comparable performance characteristics. This processor stage 30 could be implemented as part of the audio path within a subscriber's set or as an adjunct between the telephone terminal and the main communication line. As discussed in more detail below, signal reflections, or echoes, are cancelled by an echo cancellation circuit 32, while in-band FSK signals are detected by an FSK signal detector 40 and cancelled by subtracting out replica FSK signals produced by an FSK signal generator 50.

Figure 2:
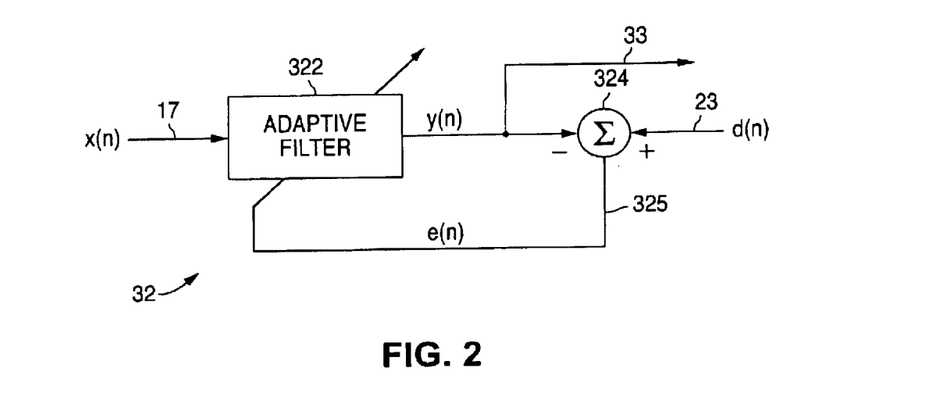
FIG. 2 is a functional block diagram of the echo cancellation circuit of FIG. 1.
Figure 3:
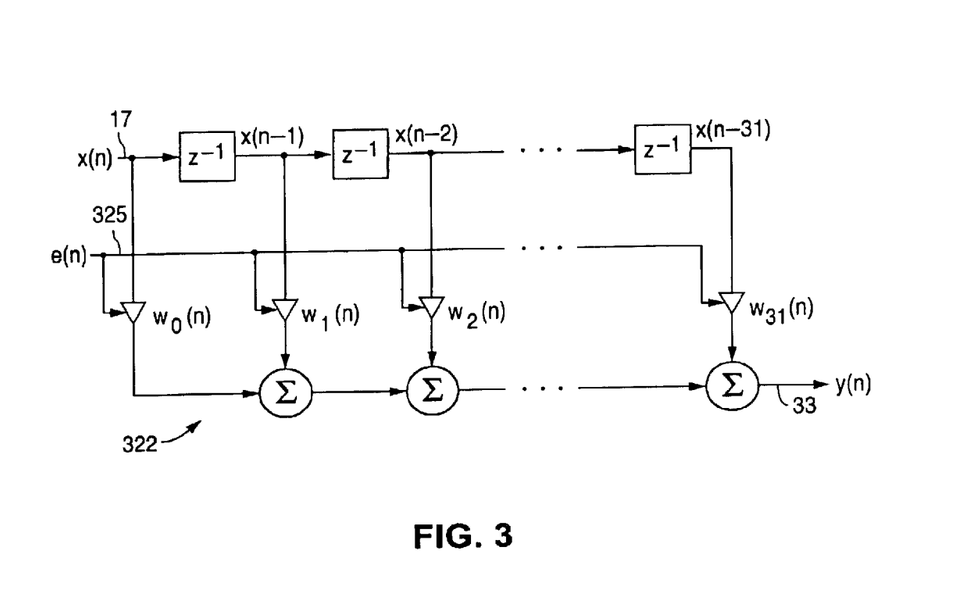
FIG. 3 is a functional block diagram of the adaptive filter circuit of FIG. 2.

The purpose of the echo cancellation circuit 32 is to cancel reflections of the user's voice signal from the nearest 2W/4W hybrid circuit 14 so as to prevent such reflections from interfering with detection of the incoming in-band FSK signals. Preferably, this circuit 32 will cancel all echoes that come within 4 milliseconds. Referring to FIG. 2, the echo cancellation circuit 32 can be implemented in the form of an adaptive filter 322 which is controlled by an error signal 325 generated by the differential summation (subtraction) of the output signal 33 and input signal 23 which is the transmission signal for the user's voice. Referring to FIG. 3, the adaptive filter 322 is preferably a conventional 32-tap adaptive finite impulse response (FIR) filter (4 milliseconds in increments of 128 microseconds) in accordance with CCITT G.165. The setup time during which the 32 coefficients of the FIR filter are trained is not critical. Therefore, the training algorithm used can be very simple, thereby requiring minimum firmware in a DSP implementation.

By differentially summing the resultant echo cancellation signal 33 with the original reception signal 17 in a summing circuit 34, a modified reception signal 35 is provided substantially without any echo signal components, thereby making the FSK detection more reliable. This modified reception signal 35 is used for detecting the in-band FSK signals. Within the FSK detector 40, a number of functions are performed. The FSK signal amplitude is detected by an FSK amplitude detector 42, the FSK signal frequency is detected by an FSK frequency detector 44, the FSK signal phase is detected by an FSK phase detector 46, while the bit clock related to the FSK signal components is recovered by an FSK bit clock recovery circuit 48. All of these parameters are provided as FSK data 41 to the FSK generator 50 which then generates a replica FSK signal 51 for differential summing in a summing circuit 38 with a time-delayed version 37 of the modified reception signal 35 (e.g., delayed by a delay circuit 36, such as a shift register).

In a preferred embodiment, a conventional FSK algorithm can be used to retrieve the FSK data, including clock and amplitude information, and, in addition thereto, two phase comparators are used to determine the phases of the FSK signal during the respective logical "zero" and "one" intervals defined by the respective FSK frequencies. The outputs of the phase comparators provide the phase information for the incoming FSK signal.

Figure 4:
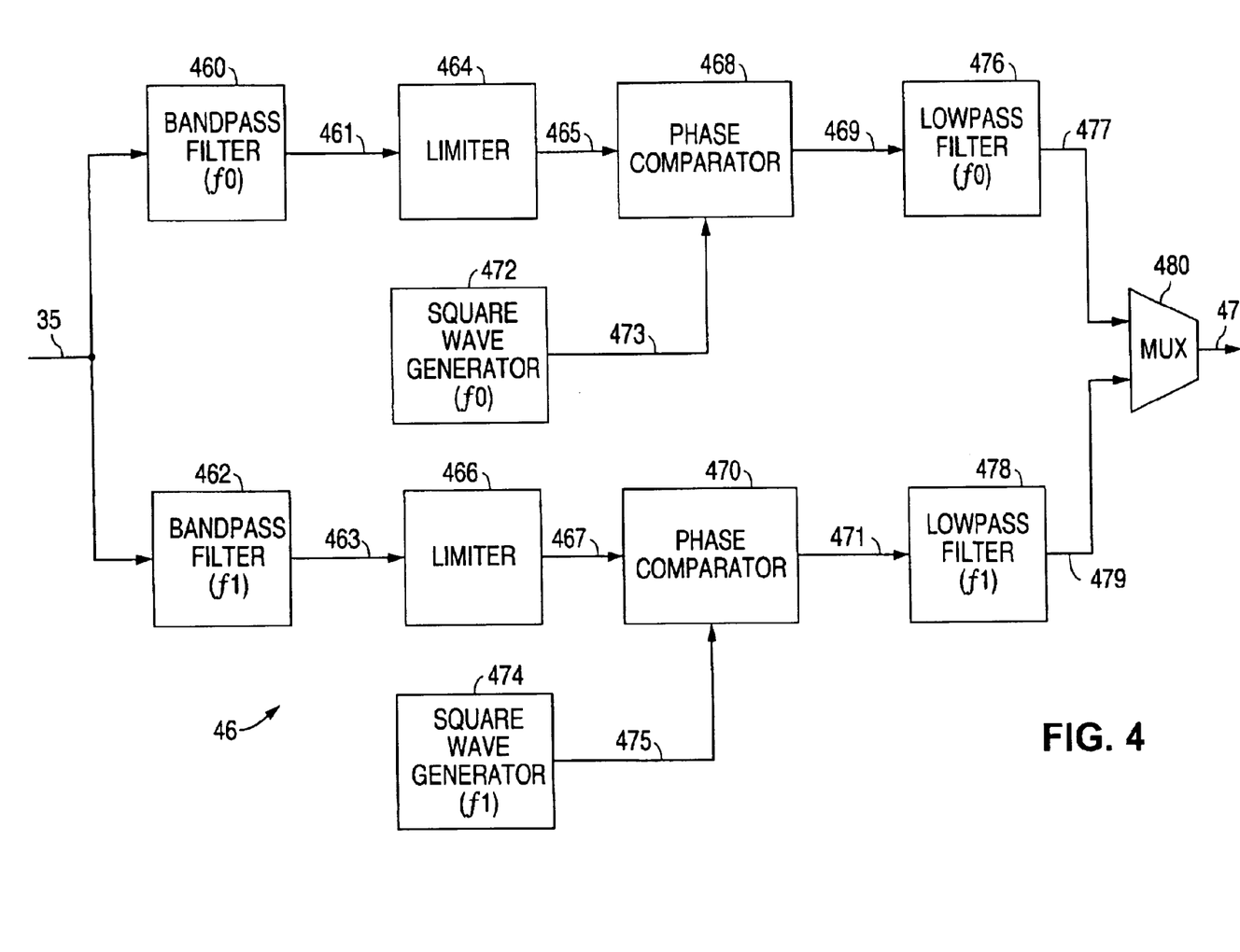
FIG. 4 is a functional block diagram of the FSK phase detector of FIG. 1.

Referring to FIG. 4, for example, one embodiment uses two bandpass filters 460, 462 to filter the incoming signal 35 at center frequencies f0 and f1 for the logical zero and logical one signals, respectively. The bandpass filtered signals 461, 463 are amplitude-limited by limiters 464, 466. The resulting amplitude-limited signals 465, 467 are then compared in phase by phase comparators 468, 470 with signals 473, 475 generated by square wave signal generators 472, 474. The resulting phase comparison signals 469, 471 are lowpass filtered by lowpass filters 476, 478 having bandwidths related to the frequencies f0 and f1 for the logical zero and logical one signals, respectively. The lowpass filtered signals 477, 479 together provide the phase information about the incoming FSK signal 35 and are combined with a multiplexor 480 to provide a portion 47 of the FSK data 41 (FIG. 1).

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a circuit for blocking reception of in-band frequency-shift keyed (FSK) signals by the reception transducer of a telephone subscriber terminal without requiring muting of said reception transducer, comprising:

a signal reception path configured to convey a telephone reception signal for conversion by a telephone reception transducer, wherein said telephone reception signal includes voice and FSK signal components; and     a FSK signal cancellation circuit, coupled to said signal reception path, configured to provide a replica FSK signal component for subtraction from said telephone reception signal to substantially cancel said FSK signal component without interrupting said conveyance of said voice signal component.

2. The apparatus of claim 1, wherein said signal reception path and said FSK signal cancellation circuit together comprise at least a portion of a digital signal processor (DSP) circuit.

3. The apparatus of claim 1, wherein:

said FSK signal cancellation circuit comprises a FSK signal detection circuit configured to receive said telephone reception signal and detect said FSK signal component and in accordance therewith provide said replica FSK signal component; and said signal reception path includes a signal combining circuit configured to receive and substract said replica FSK signal component from said telephone reception signal and in accordance therewith provide a modified telephone reception signal in which said voice signal component substantially remains and said FSK signal component is substantially cancelled.

4. An apparatus including a circuit for blocking reception of in-band frequency-shift keyed (FSK) signals by the reception transducer of a telephone subscriber terminal without requiring muting of said reception transducer, comprising:

a signal reception path configured to convey a telephone reception signal for conversion by a telephone reception transducer, wherein said telephone reception signal includes voice and FSK signal components; and a FSK signal cancellation circuit, coupled to said signal reception path, configured to substantially cancel said FSK signal component without interrupting said conveyance of said voice signal component;

wherein
said FSK signal cancellation circuit comprises a FSK signal detection circuit configured to receive said telephone reception signal and detect said FSK signal component and in accordance therewith provide a FSK cancellation signal, said signal reception path includes a signal combining circuit configured to receive and combine said FSK cancellation signal and said telephone reception signal and in accordance therewith provide a modified telephone reception signal in which said voice signal component substantially remains and said FSK signal component is substantially cancelled, and said FSK signal detection circuit comprises
a signal parameter detection circuit configured to receive said telephone reception signal and detect said FSK signal component and in accordance therewith provide FSK signal information, and
a signal generator circuit, coupled to said signal parameter detection circuit, configured to receive said FSK signal information and in accordance therewith provide a replica FSK signal as said FSK cancellation signal.

5. The apparatus of claim 4, wherein said signal parameter detection circuit comprises:

a FSK amplitude detection circuit configured to detect an amplitude of said FSK signal component and in accordance therewith provide FSK signal component amplitude information as a first portion of said FSK signal information;

a FSK clock recovery circuit configured to recover a clock signal related to said FSK signal component and in accordance therewith provide FSK signal component clock information as a second portion of said FSK signal information;

a FSK frequency detector circuit configured to detect a frequency of said FSK signal component and in accordance therewith provide FSK signal component frequency information as a third portion of said FSK signal information; and a FSK phase detection circuit configured to detect a phase of said FSK signal component and in accordance therewith provide FSK signal component phase information as a fourth portion of said FSK signal information.

6. An apparatus including a circuit for blocking reception of in-band frequency-shift keyed (FSK) signals by the reception transducer of a telephone subscriber terminal without requiring muting of said reception transducer, comprising:

a signal reception path configured to convey a telephone reception signal for conversion by a telephone reception transducer, wherein said telephone reception signal includes voice and FSK signal components; and a FSK signal cancellation circuit, coupled to said signal reception path, configured to substantially cancel said FSK signal component without interrupting said conveyance of said voice signal component;

wherein
said FSK signal cancellation circuit comprises a FSK signal detection circuit configured to receive said telephone reception signal and detect said FSK signal component and in accordance therewith provide a FSK cancellation signal, said signal reception path includes a signal combining circuit configured to receive and combine said FSK cancellation signal and said telephone reception signal and in accordance therewith provide a modified telephone reception signal in which said voice signal component substantially remains and said FSK signal component is substantially cancelled, and said signal combining circuit comprises
a signal delay circuit configured to receive and delay said telephone reception signal and in accordance therewith provide a delayed telephone reception signal, and
a signal summing circuit, coupled to said signal delay circuit, configured to receive and sum said delayed telephone reception signal and said FSK cancellation signal and in accordance therewith provide said modified telephone reception signal.

7. An apparatus including a circuit for blocking reception of in-band frequency-shift keyed (FSK) signals by the reception transducer of a telephone subscriber terminal without requiring muting of said reception transducer, comprising:

a signal reception path configured to convey a telephone reception signal for conversion by a telephone reception transducer, wherein said telephone reception signal includes voice and FSK signal components and a transmission signal echo component;

a FSK signal cancellation circuit, coupled to said signal reception path, configured to substantially cancel said FSK signal component without interrupting said conveyance of said voice signal component;

a signal transmission path configured to convey a telephone transmission signal originating from a telephone transmission traducer; and an echo signal cancellation circuit, coupled between said signal transmission and reception paths, configured to receive said telephone transmission signal and said telephone reception signal and in accordance therewith substantially cancel said transmission signal echo component from said telephone reception signal conveyed via said signal reception path.

8. The apparatus of claim 7, wherein:

said echo signal cancellation circuit comprises an adaptive filter circuit configured to receive said telephone transmission signal and in accordance herewith receive and process said telephone reception signal and in accordance therewith provide an echo cancellation signal; and said signal reception path includes a signal combining circuit configured to receive and combine said echo cancellation signal and said telephone reception signal and in accordance therewith provide a modified telephone reception signal in which said voice and FSK signal components substantially remain and said transmission signal echo component is substantially cancelled.

9. The apparatus of claim 8, wherein said adaptive filter circuit comprises:
a finite impulse response filter circuit configured to receive an error signal and in accordance therewith receive and process said telephone reception signal and in accordance therewith provide said echo cancellation signal; and
another signal combining circuit, coupled to said finite impulse response filter circuit, configured to receive and combine said telephone transmission signal and said echo cancellation signal and in accordance therewith provide said error signal.

10. An apparatus including a signal processor for blocking reception of in-band frequency-shift keyed (FSK) signals by the reception transducer of a telephone subscriber terminal without requiring muting of said reception transducer, comprising:
signal reception means for conveying a telephone reception signal for conversion by a telephone reception transducer, wherein said telephone reception signal includes voice and FSK signal components; and
FSK signal cancellation means for generating a replica FSK signal component for subtraction from said telephone reception signal to substantially cancel said FSK signal component without interrupting said conveyance of said voice signal component.

11. The apparatus of claim 10, wherein:
said FSK signal cancellation means comprises FSK signal detection means for receiving said telephone reception signal and detecting said FSK signal component and in accordance therewith providing a FSK cancellation signal; and
said signal reception means includes signal combining means for receiving and combining said FSK cancellation signal and said telephone reception signal and in accordance therewith providing a modified telephone reception signal in which said voice signal component substantially remains and said FSK signal component is substantially cancelled.

12. An apparatus including a signal processor for blocking reception of in-band frequency-shift keyed (FSK) signals by the reception transducer of a telephone subscriber terminal without requiring muting of said reception transducer, comprising:
signal reception means for conveying a telephone reception signal for conversion by a telephone reception transducer, wherein said telephone reception signal includes voice and FSK signal components; and
FSK signal cancellation means for substantially canceling said FSK signal component without interrupting said conveyance of said voice signal component;
wherein
said FSK signal cancellation means comprises FSK signal detection means for receiving said telephone reception signal and detecting said FSK signal component and in accordance therewith providing a FSK cancellation signal,
said signal reception means includes signal combining means for receiving and combining said FSK cancellation signal and said telephone reception signal and in accordance therewith providing a modified telephone reception signal in which said voice signal component substantially remains and said FSK signal component is substantially cancelled, and
said FSK signal detection means comprises
signal parameter detector means for receiving said telephone reception signal and detecting said FSK signal component and in accordance therewith providing FSK signal information, and
signal generator means for receiving said FSK signal information and in accordance therewith providing a replica FSK signal as said FSK cancellation signal.

13. The apparatus of claim 12, wherein said signal parameter detector means comprises:
FSK amplitude detector means for detecting an amplitude of said FSK signal component and in accordance therewith providing FSK signal component amplitude information as a first portion of said FSK signal information;
FSK clock recovery means for recovering a clock signal related to said FSK signal component and in accordance therewith providing FSK signal component clock information as a second portion of said FSK signal information;
FSK frequency detector means for detecting a frequency of said FSK signal component and in accordance therewith providing FSK signal component frequency information as a third portion of said FSK signal information; and
FSK phase detector means for detecting a phase of said FSK signal component and in accordance therewith providing FSK signal component phase information as a fourth portion of said FSK signal information.

14. An apparatus including a signal processor for blocking reception of in-band frequency-shift keyed (FSK) signals by the reception transducer of a telephone subscriber terminal without requiring muting of said reception transducer, comprising:
signal reception means for conveying a telephone reception signal for conversion by a telephone reception transducer, wherein said telephone reception signal includes voice and FSK signal components; and
FSK signal cancellation means for substantially canceling said FSK signal component without interrupting said conveyance of said voice signal component;
wherein
said FSK signal cancellation means comprises FSK signal detection means for receiving said telephone reception signal and detecting said FSK signal component and in accordance therewith providing a FSK cancellation signal,
said signal reception means includes signal combining means for receiving and combining said FSK cancellation signal and said telephone reception signal and in accordance therewith providing a modified telephone reception signal in which said voice signal component substantially remains and said FSK signal component is substantially cancelled, and
said signal combining means comprises
signal delay means for receiving and delaying said telephone reception signal and in accordance therewith providing a delayed telephone reception signal, and
signal summing means for receiving and summing said delayed telephone reception signal and said FSK cancellation signal and in accordance therewith providing said modified telephone reception signal.

15. An apparatus including a signal processor for blocking reception of in-band frequency-shift keyed (FSK) signals by the reception transducer of a telephone subscriber terminal without requiring muting of said reception transducer, comprising:

signal reception means for conveying a telephone reception signal for conversion by a telephone reception transducer, wherein said telephone reception signal includes voice and FSK signal components and a transmission signal echo component;

FSK signal cancellation means for substantially canceling said FSK signal component without interrupting said conveyance of said voice signal component;

signal transmission means for conveying a telephone transmission signal originating from a telephone transmission transducer; and echo signal cancellation means for receiving said telephone transmission signal and said telephone reception signal and in accordance therewith substantially canceling said transmission signal echo component from said telephone reception signal conveyed via said signal reception means.

16. The apparatus of claim 15, wherein:

said echo signal cancellation means comprises adaptive filter means for receiving said telephone transmission signal and in accordance therewith receiving and processing said telephone reception signal and in accordance therewith providing an echo cancellation signal; and said signal reception means includes signal combining means for receiving and combining said echo cancellation signal and said telephone reception signal and in accordance therewith providing a modified telephone reception signal in which said voice and FSK signal components substantially remain and said transmission signal echo component is substantially cancelled.

17. The apparatus of claim 16, wherein said adaptive filter means comprises:

finite impulse response filter means for receiving an error signal and in accordance therewith receiving and processing said telephone reception signal and in accordance therewith providing said echo cancellation signal; and further signal combining means for receiving and combining said telephone transmission signal and said echo cancellation signal and in accordance therewith providing said error signal.

18. An apparatus including a signal processor programmed for blocking reception of in-band frequency-shift keyed (FSK) signals by the reception transducer of a telephone subscriber terminal without requiring muting of said reception transducer, said signal processor programmed to perform the steps of:

conveying a telephone reception signal for conversion by a telephone reception transducer, wherein said telephone reception signal includes voice and FSK signal components; and generating a replica FSK signal component for substraction from said telephone reception signal to substantially cancel said FSK signal component without interrupting said conveyance of said voice signal component.

19. The apparatus of claim 18, wherein:

said signal processor is programmed to perform said step of substantially canceling said FSK signal component without interrupting said conveyance of said voice signal component by receiving said telephone reception signal and detecting said FSK signal component and in accordance therewith providing a FSK cancellation signal; and said signal processor is programmed to perform said step of conveying a telephone reception signal for conversion by a telephone reception transducer by receiving and combining said FSK cancellation signal and said telephone reception signal and in accordance therewith providing a modified telephone reception signal in which said voice signal component substantially remains and said FSK signal component is substantially cancelled.

20. An apparatus including a signal processor programmed for blocking reception of in-band frequency-shift keyed (FSK) signals by the reception transducer of a telephone subscriber terminal without requiring muting of said reception transducer, said signal processor programmed to perform the steps of:

conveying a telephone reception signal for conversion by a telephone reception transducer, wherein said telephone reception signal includes voice and FSK signal components; and substantially canceling said FSK signal component without interrupting said conveyance of said voice signal component;

wherein said signal processor is programmed to perform said step of substantially canceling said FSK signal component without interrupting said conveyance of said voice signal component by receiving said telephone reception signal and detecting said FSK signal component and in accordance therewith providing a FSK cancellation signal, said signal processor is programmed to perform said step of conveying a telephone reception signal for conversion by a telephone reception transducer by receiving and combining said FSK cancellation signal and said telephone reception signal and in accordance therewith providing a modified telephone reception signal in which said voice signal component substantially remains and said FSK signal component is substantially cancelled, and said signal processor is programmed to perform said step of receiving said telephone reception signal and detecting said FSK signal component and in accordance therewith providing a FSK cancellation signal by receiving said telephone reception signal and detecting said FSK signal component and in accordance therewith providing FSK signal information, and receiving said FSK signal information and in accordance therewith providing a replica FSK signal as said FSK cancellation signal.

21. The apparatus of claim 20, wherein said signal processor is programmed to perform said step of receiving said telephone reception signal and detecting said FSK signal component and in accordance therewith providing FSK signal information by:

detecting an amplitude of said FSK signal component and in accordance therewith providing FSK signal component amplitude information as a first portion of said FSK signal information;

recovering a clock signal related to said FSK signal component and in accordance therewith providing FSK signal component clock information as a second portion of said FSK signal information;

detecting a frequency of said FSK signal component and in accordance therewith providing FSK signal component frequency information as a third portion of said FSK signal information; and detecting a phase of said FSK signal component and in accordance therewith providing FSK signal component phase information as a fourth portion of said FSK signal information.

22. An apparatus including a signal processor programmed for blocking reception of in-band frequency-shift keyed (FSK) signals by the reception transducer of a telephone subscriber terminal without requiring muting of said reception transducer, said signal processor programmed to perform the steps of:

conveying a telephone reception signal for conversion by a telephone reception transducer, wherein said telephone reception signal includes voice and FSK signal components; and substantially canceling said FSK signal component without interrupting said conveyance of said voice signal component;

wherein said signal processor is programmed to perform said step of substantially canceling said FSK signal component without interrupting said conveyance of said voice signal component by receiving said telephone reception signal and detecting said FSK signal component and in accordance therewith providing a FSK cancellation signal, said signal processor is programmed to perform said step of conveying a telephone reception signal for conversion by a telephone reception transducer by receiving and combining said FSK cancellation signal and said telephone reception signal and in accordance therewith providing a modified telephone reception signal in which said voice signal component substantially remains and said FSK signal component is substantially cancelled, and said signal processor is programmed to perform said step of receiving and combining said FSK cancellation signal and said telephone reception signal and in accordance therewith providing a modified telephone reception signal in which said voice signal component substantially remains and said FSK signal component is substantially cancelled by receiving and delaying said telephone reception signal and in accordance herewith providing a delayed telephone reception signal, and receiving and summing said delayed telephone reception signal and said FSK cancellation signal and in accordance therewith providing said modified telephone reception signal.

23. An apparatus including a signal processor programmed for blocking reception of in-band frequency-shift keyed (FSK) signals by the reception transducer of a telephone subscriber terminal without requiring muting of said reception transducer, said signal processor programmed to perform the steps of:

conveying a telephone reception signal for conversion by a telephone reception transducer, wherein said telephone reception signal includes voice and FSK signal components and a transmission signal echo component;

substantially canceling said FSK signal component without interrupting said conveyance of said voice signal component;

conveying a telephone transmission signal originating from a telephone transmission transducer; and receiving said telephone transmission signal and said telephone reception signal and in accordance therewith substantially canceling said transmission signal echo component from said conveyed telephone reception signal.

24. The apparatus of claim 23, wherein:

said signal processor is programmed to perform said step of receiving said telephone transmission signal and said telephone reception signal and in accordance therewith substantially canceling said transmission signal echo component by receiving said telephone transmission signal and in accordance therewith adaptively filtering said telephone reception signal and in accordance therewith providing an echo cancellation signal; and said signal processor is programmed to perform said step of conveying a telephone transmission signal originating from a telephone transmission transducer reception by receiving and combining said echo cancellation signal and said telephone reception signal and in accordance therewith providing a modified telephone reception signal in which said voice and FSK signal components substantially remain and said transmission signal echo component is substantially cancelled.

25. The apparatus of claim 24, wherein said signal processor is programmed to perform the step of receiving said telephone transmission signal and in accordance therewith adaptively filtering said telephone reception signal and in accordance therewith providing an echo cancellation signal by:

receiving an error signal and in accordance therewith receiving and filtering said telephone reception signal in accordance with a finite impulse response function and in accordance therewith providing said echo cancellation signal; and receiving and combining said telephone transmission signal and said echo cancellation signal and in accordance therewith providing said error signal.

* * * * *

UNITED STATES PATENT AND TRADEMARK OFFICE
CERTIFICATE OF CORRECTION

PATENT NO. : 6,795,551 B1  
DATED : September 21, 2004  
INVENTOR(S) : Tielens et al.

It is certified that error appears in the above-identified patent and that said Letters Patent is hereby corrected as shown below:

Column 6,
Line 64, please delete "herewith" and replace with -- therewith --.

Column 11,
Line 52, please delete "herewith," and replace with -- therewith --.

Signed and Sealed this

Fourteenth Day of December, 2004

JON W. DUDAS
*Director of the United States Patent and Trademark Office*